United States Patent
Dontula et al.

(10) Patent No.: US 6,514,659 B1
(45) Date of Patent: Feb. 4, 2003

(54) FOAM CORE IMAGING MEMBER WITH GLOSSY SURFACE

(75) Inventors: Narasimharao Dontula, Rochester, NY (US); Suresh Sunderrajan, Rochester, NY (US); Thaddeus S. Gula, Rochester, NY (US); William A. Mruk, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/723,489

(22) Filed: Nov. 28, 2000

(51) Int. Cl.⁷ .................. G03C 1/795; G03C 1/765; G03C 1/93; G03C 8/52; G03G 5/10
(52) U.S. Cl. .................. 430/201; 430/60; 430/200; 430/496; 430/536; 347/106; 503/227
(58) Field of Search .................. 430/536, 496, 430/60, 200, 201; 347/106; 503/227

(56) References Cited

U.S. PATENT DOCUMENTS

| | | | |
|---|---|---|---|
| 4,469,741 A | 9/1984 | Akao | 428/214 |
| 4,533,578 A | 8/1985 | Boyd et al. | 428/35 |
| 4,565,733 A | 1/1986 | Akao | 428/215 |
| 4,661,401 A | 4/1987 | Akao | 428/215 |
| 4,832,775 A | 5/1989 | Park et al. | 156/272.6 |
| 5,393,603 A | 2/1995 | Toyoda et al. | 428/316.6 |
| 5,851,651 A | 12/1998 | Chao | 428/327 |
| 5,861,201 A | 1/1999 | Blackwelder et al. | 428/36.91 |
| 5,866,282 A | 2/1999 | Bourdelais et al. | 430/536 |
| 5,888,643 A * | 3/1999 | Aylward et al. | 430/536 |
| 6,153,367 A | 11/2000 | Gula et al. | 430/536 |
| 6,447,976 B1 | 9/2002 | Dontula et al. | 430/201 |

FOREIGN PATENT DOCUMENTS

| | | |
|---|---|---|
| EP | 0 360 201 | 3/1990 |
| JP | 9-179241 | 7/1997 |

OTHER PUBLICATIONS

Japanese Patent Abstract JP 9127648.
Japanese Patent Abstract JP 9106038.
Japanese Patent Abstract JP 2839905.
Co-pending USSN 09/723,518, filed Nov. 28, 2000, Dontula et al., Foam Core Imaging Member, (D–81644).

* cited by examiner

Primary Examiner—Richard L. Schilling
(74) Attorney, Agent, or Firm—Paul A. Leipold; Lynne M. Blank

(57) ABSTRACT

The invention relates to an imaging member comprising an imaging layer and a base wherein said base comprises a closed cell foam core sheet and adhered thereto an upper and lower flange sheet wherein said upper flange sheet comprises oriented polystyrene or polypropylene polymer wherein the modulus of said upper flange sheet is between 1000 and 3500 MPa and the roughness of the upper surface of said base is less than 0.4 μm Ra.

13 Claims, 2 Drawing Sheets

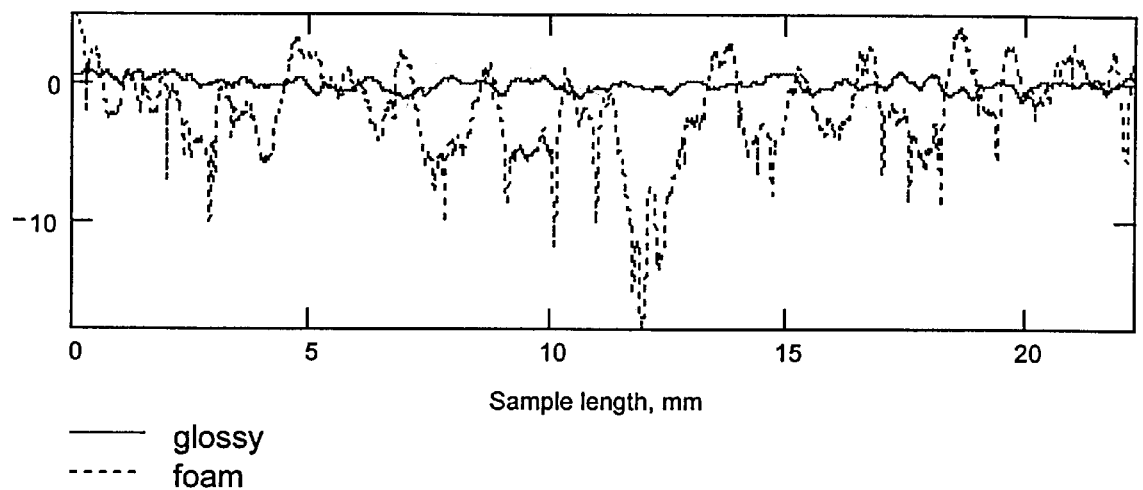
Fig. 1 – Prior Art
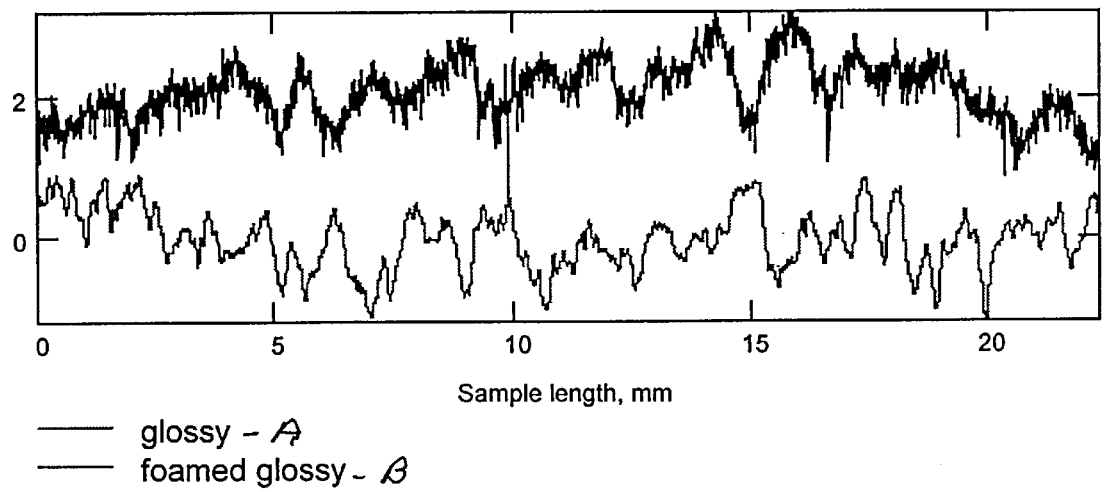
Fig. 2

FOAM CORE IMAGING MEMBER WITH GLOSSY SURFACE

FIELD OF THE INVENTION

This invention relates to imaging media. In a preferred form, it relates to supports for photographic, ink jet, thermal, and electrophotographic media.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance.

In addition to these fundamental requirements, imaging supports are also subject to other specific requirements depending upon the mode of image formation onto the support. For example, in the formation of photographic paper, it is important that the photographic paper be resistant to penetration by liquid processing chemicals failing which there is present a stain on the print border accompanied by a severe loss in image quality. In the formation of 'photo-quality' ink jet paper, it is important that the paper is readily wetted by ink and that it exhibits the ability to absorb high concentrations of ink and dry quickly. If the ink is not absorbed quickly, the elements block (stick) together when stacked against subsequent prints and exhibit smudging and uneven print density. For thermal media, it is important that the support contain an insulative layer in order to maximize the transfer of dye from the donor which results in a higher color saturation.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. For example, it is known that a conventional photographic paper comprises a cellulose paper base that has applied thereto a layer of polyolefin resin, typically polyethylene, on each side, which serves to provide waterproofing to the paper and also provides a smooth surface on which the photosensitive layers are formed. In another imaging material as in U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments such as $TiO_2$ above and below the microvoided layer. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create 'photo-quality' ink jet paper.

In all of the above imaging supports, multiple operations are required to manufacture and assemble all of the individual layers. For example, photographic paper typically requires a paper-making operation followed by a polyethylene extrusion coating operation, or as disclosed in U.S. Pat. No. 5,866,282, a paper-making operation is followed by a lamination operation for which the laminates are made in yet another extrusion casting operation. There is a need for imaging supports that can be manufactured in a single in-line manufacturing process while still meeting the stringent features and quality requirements of imaging bases.

It is also well known in the art that traditional imaging bases consist of raw paper base. For example, in typical photographic paper as currently made, approximately 75% of the weight of the photographic paper comprises the raw paper base. Although raw paper base is typically a high modulus, low cost material, there exist significant environmental issues with the paper manufacturing process. There is a need for alternate raw materials and manufacturing processes that are more environmentally friendly. Additionally to minimize environmental impact, it is important to reduce the raw paper base content, where possible, without sacrificing the imaging base features that are valued by the customer, i.e., strength, stiffness, surface properties, etc. of the imaging support.

An important corollary of the above is the ability to recycle photographic paper. Current photographic papers cannot be recycled because they are composites of polyethylene and raw paper base and, as such, cannot be recycled using polymer recovery processes or paper recovery processes. A photographic paper that comprises significantly higher contents of polymer lends itself to recycling using polymer recovery processes.

Existing composite color paper structures are typically subject to curl through the manufacturing, finishing, and processing operations. This curl is primarily due to internal stresses that are built into the various layers of the composite structure during manufacturing and drying operations, as well as during storage operations (core-set curl). Additionally, since the different layers of the composite structure exhibit different susceptibility to humidity, the curl of the imaging base changes as a function of the humidity of its immediate environment. There is a need for an imaging support that minimizes curl sensitivity as a function of humidity, or ideally, does not exhibit curl sensitivity.

The stringent and varied requirements of imaging media, therefore, demand a constant evolution of material and processing technology. One such technology known in the art as 'polymer foams' has previously found significant application in food and drink containers, packaging, furniture, appliances, etc. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to said major surface of the polystyrene foam substrate. The foregoing composite foam/film structure can be shaped by conventional processes as thermoforming to provide numerous types of useful articles including cups, bowls, and plates, as well as cartons and containers that exhibit excellent levels of puncture, flex-crack, grease and abrasion resistance, moisture barrier properties, and resiliency.

Foams have also found limited application in imaging media. For example, JP 2839905 B2 discloses a 3-layer structure comprising a foamed polyolefin layer on the image-receiving side, raw paper base, and a polyethylene resin coat on the backside. The foamed resin layer was created by extruding a mixture of 20 weight % titanium dioxide master batch in low density polyethylene, 78 weight % polypropylene, and 2 weight % of Daiblow PE-M20 (AL)NK blowing agent through a T-die. This foamed sheet was then laminated to the paper base using a hot melt adhesive. The disclosure JP 09127648 A highlights a variation of the JP 2839905 B2 structure, in which the resin on the backside of the paper base is foamed, while the image receiving side resin layer is unfoamed. Another variation is a 4-layer structure highlighted in JP 09106038 A. In this, the image receiving resin layer comprises of 2 layers, an unfoamed resin layer which is in contact with the emulsion, and a foamed resin layer which is adhered to the paper base. There are several problems with this, however. Structures described in the foregoing patents need to use foamed layers as thin as 10 µm to 45 µm, since the foamed resin layers are being used to replace existing resin coated layers to the paper base. The thickness restriction is further needed to maintain the structural integrity of the photographic paper base since the raw paper base is providing the stiffness. It is known by those versed in the art of foaming that it is very difficult to make thin uniform foamed films with substantial reduction in density especially in the thickness range noted above.

A further requirement for useful photographic elements is to provide a surface for an image-forming emulsion or gel layer that has a particular smoothness that, after coating with gel or emulsion, has a "glossy" surface. A Gardner glossmeter can be used to measure the scattered light reflection from a surface; "glossy" surfaces typically reflect 40 % or more of the incident light so as to provide a shiny appearance.

Typical resin coated photographic paper, as currently made, utilizes the natural roughness of the raw paper base, as well as special chill rollers to obtain the required surfaces for control of gloss. The chill roller is used to form the melt extruded polyethylene plastic layer on raw paper base to get a very specific high performance surface.

Problem to be Solved by the Invention

There is a need for a composite imaging material base material that can be manufactured in a single in-line operation.

There is also a need for an imaging base that reduces the amount of raw paper base that is used.

There is also a need for an imaging base that can be effectively recycled.

There is also a need for an imaging base that resists the tendency to curl as a function of ambient humidity.

There is also a need for an imaging base that can supply a "glossy" surface when further coated by existing gel or emulsion systems.

There is also a need for an imaging base that can supply a particular surface that provides high speed coatability for existing gel or emulsion systems.

SUMMARY OF THE INVENTION

It is an object of the invention to provide a composite imaging material that meets the requirements of an imaging base, specifically with regard to features such as the basis weight, caliper, stiffness, smoothness, gloss, edge penetration, and opacity.

It is another object of this invention to provide a composite imaging material that resists humidity curl.

It is another object to provide an imaging member that can be manufactured in-line in a single operation.

It is a further object to provide an imaging member that can be recycled.

It is a further object to provide an imaging member that provides a base that is capable of a "glossy" surface.

It is a further object to provide an imaging member that provides a base that is capable of high speed coating of gels or emulsions.

These and other objects of the invention are accomplished by an imaging member comprising an imaging layer and a base wherein said base comprises a closed cell foam core sheet and adhered thereto an upper and lower flange sheet wherein said upper flange sheet comprises oriented polystyrene or polyolefin wherein the modulus of said upper flange sheet is between 1000 and 3500 MPa and the roughness of the upper surface of said base is less than 0.4 µm Ra.

Advantageous Effect of the Invention

This invention provides a superior imaging support. Specifically, it provides an imaging support of high stiffness, precise smoothness for high gloss and coatability, high opacity, and excellent humidity curl resistance. It also provides an imaging support that can be manufactured using a single in-line operation. It also provides an imaging support that can be effectively recycled.

BRIEF DESCRIPTION OF THE DRAWINGS

FIG. 1 illustrates the surface texture of prior art foam and photographic paper.

FIG. 2 illustrates the foam surface texture of the invention compared with glossy prior art photographic paper.

DETAILED DESCRIPTION OF THE INVENTION

Figure 3:
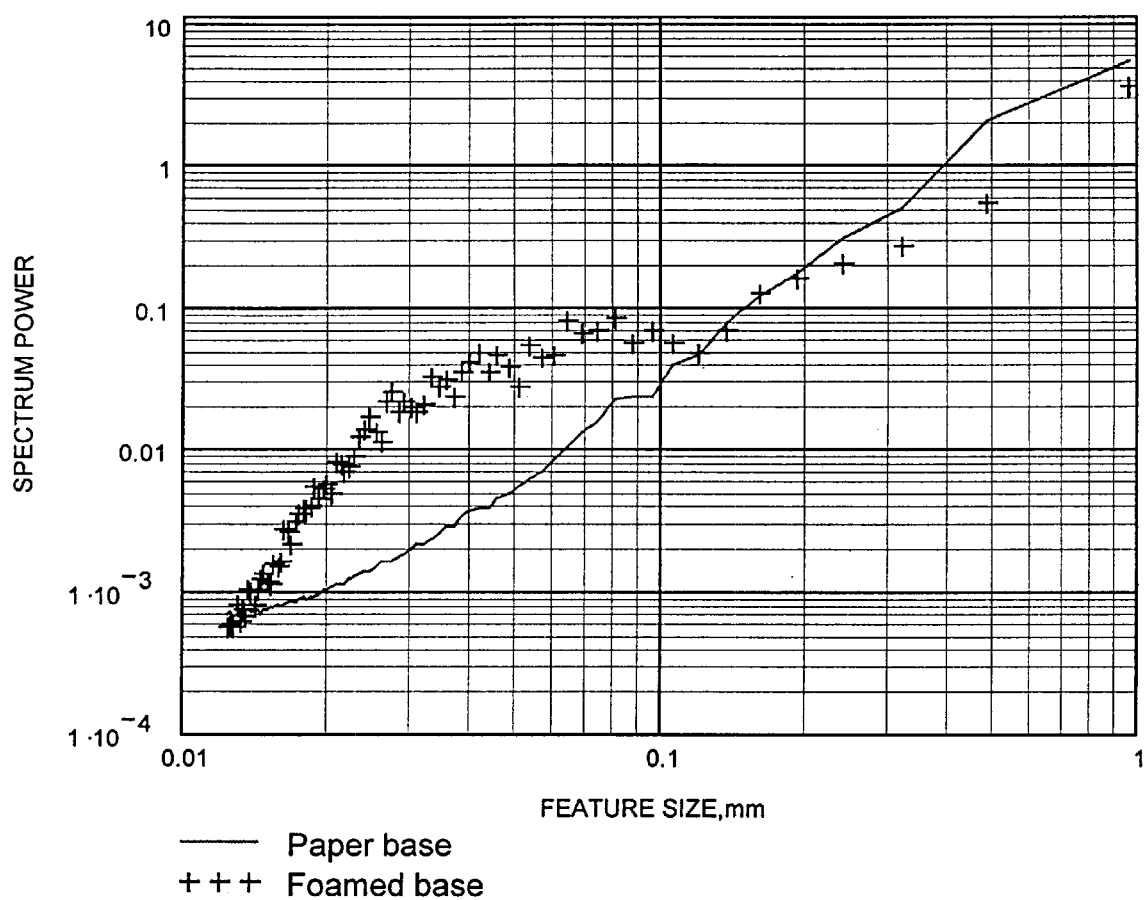
FIG. 3 illustrates the surface texture of an invention foam base and a resin coat photographic paper base.

This invention has numerous advantages. The invention produces an element that has much less tendency to curl when exposed to extremes in humidity. The element can be manufactured in a single in-line operation. This significantly lowers element manufacturing costs and would eliminate disadvantages in the manufacturing of the current generation of imaging supports including very tight moisture specifications in the raw base and specifications to minimize pits during resin coating. The element can also be recycled to recover and reuse polyolefin instead of being discarded into landfills. It is an objective of this invention to use foam at the core of the imaging base, with high modulus flange layers that provide the needed stiffness surrounding the foam core on either side. Using this approach, many new features of the imaging base may be exploited, and restrictions in manufacturing eliminated. These and other advantages will be apparent from the detailed description below.

The imaging member of the invention comprises a polymer foam core that has adhered thereto an upper and a lower flange sheet. The polymer foam core comprises a homopolymer such as a polyolefin, polystyrene, polyvinylchloride or other typical thermoplastic polymers; their copolymers or their blends thereof; or other polymeric systems like polyurethanes, polyisocyanurates; that has been expanded through the use of a blowing agent to consist of two phases, a solid polymer matrix and a gaseous phase. Other solid phases may be present in the foams in the form of fillers that are of organic (polymeric, fibrous) or inorganic (glass, ceramic, metal) origin. The fillers may be used for physical, optical, chemical, or processing property enhancements of the foam.

The foaming of these polymers may be carried out through several mechanical, chemical, or physical means.

Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention polyolefins such as polyethylene and polypropylene, their blends and their copolymers are used as the matrix polymer in the foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis (benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, azodicarbonamide, though others can also be used. If necessary, these foaming agents may be used together with an auxiliary foaming agent, nucleating agent, and a cross-linking agent.

The flange sheets of this invention are chosen to satisfy specific requirements of flexural modulus, caliper, surface roughness, and optical properties such as colorimetry and opacity. The flange members may be formed integral with the foam core by manufacturing the foam core with a flange skin sheet or the flange may be laminated to the foam core material. The integral extrusion of flange members with the core is preferred for cost. The lamination technique allows a wider range of properties and materials to be used for the skin materials. Imaging elements are constrained to a range in stiffness and caliper. At stiffness below a certain minimum stiffness, there is a problem with the element in print stackability and print conveyance during transport through photofinishing equipment, particularly high speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important for the same transport reasons through photofinishing equipment that the caliper of the imaging element be constrained between 75 $\mu$m and 350 $\mu$m.

Imaging elements are typically constrained by consumer performance and present processing machine restrictions to a stiffness range of between approximately 50 mN and 250 mN and a caliper range of between approximately 100 $\mu$m and 400 $\mu$m. In the design of the element of the invention, there exists a relationship between stiffness of the imaging element and the caliper and modulus of the foam core and modulus of the flange sheets, i.e., for a given core thickness, the stiffness of the element can be altered by changing the caliper of the flange elements and/or changing the modulus of the flange elements and/or changing the modulus of the foam core.

If the target overall stiffness and caliper of the imaging element are specified then for a given core thickness and core material, the target caliper and modulus of the flange elements are implicitly constrained. Conversely, given a target stiffness and caliper of the imaging element for a given caliper and modulus of the flange sheets, the core thickness and core modulus are implicitly constrained.

Preferred ranges of foam core caliper and modulus and flange caliper and modulus follow: the preferred caliper of the foam core of the invention ranges between 200 $\mu$m and 350 $\mu$m, the caliper of the flange sheets of the invention ranges between 10 $\mu$m and 175 $\mu$m, the modulus of the foam core of the invention ranges between 30 MPa and 1000 MPa, and the modulus of the flange sheets of the invention ranges from 700 MPa to 10500 MPa. In each case, the above range is preferred because of (a) consumer preference, (b) manufacturability, and (c) materials selection. It is noted that the final choice of flange and core materials, modulus, and caliper will be a subject of the target overall element stiffness and caliper.

The selection of core material, the extent of density reduction (foaming), and the use of any additives/treatments for, e.g., cross-linking the foam, determine the foam core modulus. The selection of flange materials and treatments (for example, the addition of strength agents, etc. for paper base or the use of filler materials for polymeric flange materials) determines the flange modulus.

For example, at the low end of target stiffness (50 mN) and caliper (100 $\mu$m), given a typical polyolefin foam of caliper 50 $\mu$m and modulus 137.9 MPa, the flange sheet caliper is then constrained to 25 $\mu$m on each side of the core, and the flange modulus required is 10343 MPa, properties that can be met using a high modulus paper base. Also, for example, at the high end of target stiffness (250 mN) and caliper (400 $\mu$m), given a typical polyolefin foam of caliper 300 $\mu$m and modulus 137.9 MPa, the flange sheet caliper is constrained to 50 $\mu$m on each side and the flange modulus required is 1034 MPa, properties that can be met using a polyolefin flange sheet.

In a preferred lamination embodiment of this invention, the flange sheets used comprise paper. The paper of this invention can be made on a standard continuous fourdrinier wire machine or on other modem paper formers. Any pulps known in the art to provide paper may be used in this invention. Bleached hardwood chemical kraft pulp is preferred, as it provides brightness, a good starting surface, and good formation while maintaining strength. Paper flange sheets useful to this invention are of caliper between about 25 $\mu$m and about 100 $\mu$m, preferably between about 30 $\mu$m and about 70 $\mu$m because then the overall element thickness is in the range preferred by customers for imaging element and processes in existing equipment. They must be "smooth" as to not interfere with the viewing of images. Chemical additives to impart hydrophobicity (sizing), wet strength, and dry strength may be used as needed. Inorganic filler materials such as $TiO_2$, talc, and $CaCO_3$ clays may be used to enhance optical properties and reduce cost as needed. Dyes, biocides, processing chemicals, etc. may also be used as needed. The paper may also be subject to smoothing operations such as dry or wet calendering, as well as to coating through an in-line or an off-line paper coater.

In another preferred lamination embodiment of this invention, the flange sheets used comprise high modulus polymers such as high density polyethylene, polypropylene, or polystyrene; their blends or their copolymers; that have been stretched and oriented. They may be filled with suitable filler materials as to increase the modulus of the polymer and enhance other properties such as opacity and smoothness. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, polyester fibers, and the like. The preferred fillers are talc, mica, and calcium carbonate because they provide excellent modulus enhancing properties. Polymer flange sheets useful to this invention are of caliper between about 10 $\mu$m and about 150 $\mu$m, preferably between about 35 $\mu$m and about 70 $\mu$m.

Manufacturing Process

The elements of the invention can be made using several different manufacturing methods. The coextrusion, quenching, orienting, and heat setting of the element may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the foam core component of the element and the polymeric integral flange components are quenched below their glass solidification temperature. The flange components may be extruded through a multiple stream die with the outer flange forming polymer streams not containing foaming agent, Alternatively, the surface of the foaming agent containing polymer may be cooled to prevent surface foaming and form a flange. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining, to some degree, the sheet against retraction in both directions of stretching.

The element, while described as having preferably at least three layers of a foam core and a flange layer on each side, may also be provided with additional layers that may serve to change the properties of the element. Imaging elements could be formed with surface layers that would provide an improved adhesion or look.

These elements may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion.

The element may also be made through the extrusion laminating process. Extrusion laminating is carried out by bringing together the paper or polymeric flange sheets of the invention and the foam core with application of an adhesive between them, followed by their being pressed in a nip such as between two rollers. The adhesive may be applied to either the flange sheets or the foam core prior to their being brought into the nip. In a preferred form, the adhesive is applied into the nip simultaneously with the flange sheets and the foam core. The adhesive may be any suitable material that does not have a harmful effect upon the element. A preferred material is polyethylene that is melted at the time it is placed into the nip between the foam core and the flange sheet. Addenda may also be added to the adhesive layer. Any know material used in the art to improve the optical performance of the system may be used. The use of $TiO_2$ is preferred. During the lamination process also, it is desirable to maintain control of the tension of the flange sheets in order to minimize curl in the resulting laminated receiver support.

Foam Core Specifications

The suitable range in caliper of the foam core is from 25 $\mu$m to 350 $\mu$m. The preferred caliper range is between 50 $\mu$m and 200 $\mu$m because of the preferred overall caliper range of the element which lies between 100 $\mu$m and 400 $\mu$m. The range in density reduction of the foam core is from 20% to 95%. The preferred range in density reduction is between 40% and 70%. This is because it is difficult to manufacture a uniform product with very high density reduction (over 70%). Density reduction is the percent difference between solid polymer and a particular foam sample. It is also not economical to manufacture a product with density reduction less than 40%.

In another embodiment of this invention, the flange sheets used comprise paper on one side and a high modulus polymeric material on the other side. In another embodiment, an integral skin may be on one side and another skin laminated to the other side of the foam core.

The caliper of the paper and of the high modulus polymeric material is determined by the respective flexural modulus such that the overall stiffness of the imaging element lies within the preferred range, and the bending moment around the central axis is balanced to prevent excessive curl.

In addition to the stiffness and caliper, an imaging element needs to meet constraints in surface smoothness and optical properties such as opacity and colorimetry. Useful imaging bases created with all plastic layers and foaming are required to have a specific surface texture under the image forming layer. FIG. 1 shows filtered surface traces of a "glossy" surface of a resin coated photographic member and a typical plastic foam.

As shown by FIG. 1, foamed plastic layers are by themselves, typically much too rough to be used for most imaging materials. It is an objective of this invention to use foam at the core of the imaging base, with high modulus flange layers that provide the needed stiffness and smooth surface surrounding the foam core on either side. It is beneficial that the smooth high modulus flange layers provide isolation of the rough foam core from the imaging layer. The thickness, strength, and inherent roughness of the flanged layer can be optimized to control gloss in the final product. The gloss has been found to relate to the surface features remaining after coating that cause specular light reflection. Further study has proven that the surface under the emulsion has a very large effect on the resultant emulsion or gel texture and, therefore, has to have particular qualities to insure adequate "gloss".

The features of a good surface that are important can be shown to have a size in the plane of the sheet of from 0.01 to 1.0 mm. This relates to the lateral pitch of the surface bumps and not to the number that can be used to measure surface roughness. A typical filtered surface roughness average for a that produces a glossy product is 0.2 $\mu$m. Roughness average (Ra) may be obtained from a digitized surface trace by a mathematical average of the absolute difference of each point from the overall average height. The trace length should be 20 mm or more to statistically sample a surface for gloss. Usually it is necessary to filter the raw data to eliminate low frequency features in the data with a lateral size of greater than 1 mm, thereby reducing the resultant surface variation data to features of interest for light scattering and gloss. This also means that the Ra reading depends on the filtering used on the original data; all Ra data referenced in this invention is filtered with a 1.0 mm high pass cutoff filter. Digital traces have been obtained to show in FIG. 2 the similarity of the standard glossy surface A and an example of the invention B claimed for a composite foamed replacement. FIG. 2 illustrates filtered surface traces of photographic bases. The A surface is a typical resin coated photographic color paper. The B surface is a good imaging element glossy surface.

A more precise mathematical description of the invention may be shown by power spectrum analysis of the surface of the imaging base. It has been found that certain all plastic foamed structures have been made with beneficial effects on gloss and coatability. As shown by FIG. 3, the foam cored material of the invention with integral flanges have a glossy surface. FIG. 3 illustrates the power spectrum analysis of the surfaces under the emulsion for typical photographic paper base and entirely plastic foamed supports of the invention.

A power spectrum analysis can be used to show the specific combinations of amplitude and pitch that characterize a surface. In this particular analysis, the features of the surface that have a pitch of 0.1 to 1.0 mm are similar in power and, therefore, similar in surface roughness. Features with a lateral size of 0.1 to 1.0 mm are controlling factors for prevention of excessive light scattering, or loss in gloss, in resultant coatings.

The sampling rate should be high enough to discern features with a pitch of 0.005 micrometers. Roughness features at a size of 0.01 to 0.1 micrometers have been found to improve the high speed coatability of gels and emulsions, and it is very important that they are present, at the correct level, for any economical imaging support. In the example of FIG. 3, the features at a size of 0.01 to 0.1 mm are rougher for the invention than normal glossy products, contributing to improvements in high speed coatability.

Optical properties such as opacity and colorimetry may be met by the appropriate use of filler materials such as titanium dioxide and calcium carbonate and colorants, dyes and/or optical brighteners or other additives known to those skilled in the art. Any suitable white pigment may be incorporated in the polyolefin layer, such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the polyolefin. The preferred pigment is titanium dioxide. Any suitable optical brightener may be employed in the polyolefin layer including those described in *Research Disclosure*, Vol. 308, December 1989, Item 308119, Paragraph V, page 998.

In addition, it may be necessary to use various additives such as antioxidants, slip agents, or lubricants, and light stabilizers in the plastic elements as well as biocides to the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene- 1 ,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly{[6-[(1,1,3,3-tetramethylbutylamino}-1 ,3,5-triazine-4-piperidinyl)-imino]-1,6-hexanediyl[{2,2,6,6-tetramethyl-4-piperdinyl) imino] }(Chimassorb 944 LD/FL).

Used herein, the phrase 'imaging element' comprises an imaging support as described above, along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements of the invention, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as ink jet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer of the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly (methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer, such as, for example, a layer comprising a cellulose derivative or a cationically-modified cellulose derivative or mixtures hereof. An especially preferred overcoat is poly α-1,4-anhydro-glucose-g -oxyethylene-g-(2'-hydroxypropyl)-N, N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 $\mu$m, preferably about 0.25 to about 3 $\mu$m.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%-10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer or TL at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 disclose aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 disclose aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717.

Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque paper bases are useful in combination with silver halide images because the contrast range of the silver halide image is improved and show through of ambient light during image viewing is reduced. The photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 μseconds duration in a pixel-by-pixel mode wherein the silver halide emulsion layer is comprised of silver halide grains is also suitable. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. This invention in a preferred embodiment utilizes a radiation-sensitive emulsion comprised of silver halide grains (a) containing greater than 50 mole percent chloride based on silver, (b) having greater than 50 percent of their surface area provided by { 100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \qquad (I)$$

wherein n is zero, −1, −2, −3, or −4; M is a filled frontier orbital polyvalent metal ion, other than iridium; and $L_6$ represents bridging ligands which can be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand. Preferred photographic imaging layer structures are described in EP Publication 1 048 977. The photosensitive imaging layers described therein provide particularly desirable images on the base of this invention.

This invention is directed towards a photographic recording element comprising a support and at least one light sensitive silver halide emulsion layer comprising silver halide grains as described above.

The following examples illustrate the practice of this invention. They are not intended to be exhaustive of all possible variations of the invention. Parts and percentages are by weight unless otherwise indicated.

EXAMPLES

Example 1 (Control) is representative of the prior art and is presented here for comparison purposes. It comprises a photographic paper raw base made using a standard fourdrinier paper machine utilizing a blend of mostly bleached hardwood Kraft fibers. The fiber ratio consisted primarily of bleached poplar (38%) and maple/beech (37%) with lesser amounts of birch (18%) and softwood (7%). Acid sizing chemical addenda, utilized on a dry weight basis, included an aluminum stearate size at 0.85% addition, polyaminoamide epichlorhydrin at 0.68% addition, and polyacrylamide resin at 0.24% addition. Titanium dioxide filler was used at 0.60% addition. Surface sizing using hydroxyethylated starch and sodium bicarbonate was also employed. This raw base was then extrusion coated using a face side composite comprising substantially 83% LDPE, 12.5% titanium dioxide, 3% zinc oxide and 0.5% of calcium stearate and a wire side HDPE/LDPE blend at a 46/54 ratio. Resin coverages were approximately 27 g/m². A chill roller with a surface roughness of 0.19 μm Ra was used to form the surface of the face (imaging) side.

Example 2 of the Invention comprises a foamed polypropylene 110 μm thick, and has a basis weight of 61.0 g/m². This foam which has been corona treated was melt extrusion laminated on each side with an oriented polystyrene sheet which was 57.15 μm thick, having a density of 1.05 gm/cm³ and has a flexural modulus in the range of 2585–3070 megapascal. An ethylene methylacrylate tie layer, specifically an Equistar grade 806–009 was used to accomplish the lamination. The tie layer coverage was approximately 12.2 g/m². Subsequent to lamination of the paper samples, the substrate was extrusion resin coated using similar face side and wire side blends at approximately half the resin coverages used in sample 1 above, and using the same 0.19 μm Ra chill roller.

Example 3 of the Invention, similar to Example 2 but for the thickness of the flange layers, comprises a foamed polypropylene 110 μm thick, and has a basis weight of 61.0 g/m². This foam, which has been corona treated, was melt extrusion laminated on each side with an oriented polystyrene sheet which was 31.75 μm thick, having a density of 1.05 gm/cm³ and has a flexural modulus in the range of 2585–3070 megapascal. An ethylene methylacrylate tie layer, specifically an Equistar grade 806–009, was used to accomplish the lamination. The tie layer coverage was approximately 12.2 g/m². Subsequent to lamination of the paper samples, the substrate was extrusion resin coated using similar face side and wire side blends at approximately half the resin coverages used in sample 1 above, and using the same 0.19 μm Ra chill roller.

Example 4 of the Invention comprises a foamed polypropylene 110 μm thick, and has a basis weight of 61.0 g/m² was then extrusion coated using a face side composite comprising substantially 83% LDPE, 12.5% titanium dioxide, 3% zinc oxide and 0.5% of calcium stearate and a wire side HDPE/LDPE blend at a 46/54 ratio. Resin coverages were approximately 27 g/m². A chill roller with a surface roughness of 0.19 μm Ra was used to form the surface of the face (imaging) side.

RESULTS

| Description | Ra in μm | Suitable for Glossy? |
|---|---|---|
| Example 1  PE on paper (control) | 0.19 μm | Yes |
| Example 2  57.15 μm OPS on Foam | 0.33 μm | Yes |
| Example 3  31 μm OPS on Foam | 0.63 μm | No |
| Example 4  PE on Foam | 1.10 μm | No |

It has been shown in Examples 3 and 4 that foam with a polyethylene layer or that foam with a thin layer of oriented polystyrene sheet cannot provide an adequate surface for gloss apparently because they cannot hide the roughness of the foamed layers underneath them. Example 2 demonstrates the value of this Invention because a usable glossy surface was obtained if a sufficiently thick layer of strong oriented polystyrene sheet was applied to the foam layer. The power spectrum of the thick and thin OPS assemblies of Examples 2 and 3 shows that the thin OPS sample had more roughness at low frequencies or larger feature sizes, as would be expected if the roughness difference between the samples was due to isolation of the rough foam; that is, the larger features would be more likely to show through than the small features.

What is claimed is:

1. An imaging member comprising an imaging layer and a base wherein said base comprises a closed cell foam core sheet and adhered thereto an upper and lower flange sheet wherein said upper flange sheet comprises oriented polystyrene or polypropylene polymer wherein the modulus of said upper flange sheet is between 1000 and 3500 MPa, wherein the roughness of the upper surface of said base is less than 0.4 μm Ra, and wherein said closed cell foam core sheet comprises a polymer that has been expanded through the use of a blowing agent.

2. The imaging member of claim 1 wherein the roughness of the upper surface of said base is between 0.2 and 0.34 μm Ra.

3. The imaging member of claim 1 wherein said modulus of said upper flange sheet is between 2700 and 3200 MPa.

4. The imaging member of claim 1 wherein said foam core comprises polyolefin.

5. The imaging member of claim 1 wherein said upper flange is laminated to said core with an adhesive.

6. The imaging member of claim 1 wherein said foam core has a thickness of between 25 and 175 μm.

7. The imaging member of claim 1 wherein said upper flange is provided with an upper subbing layer.

8. The imaging member of claim 7 wherein said subbing layer comprises polyethylene.

9. The imaging member of claim 1 further comprising at least one photosensitive silver halide layer.

10. The imaging member of claim 1 wherein said imaging layer comprises an ink jet receiving layer.

11. The imaging member of claim 1 wherein said imaging layer comprises a thermal dye receiving layer.

12. The imaging member of claim 1 wherein said foam core has an upper surface roughness of between 1.0 and 3.0 μm Ra.

13. The imaging member of claim 1 wherein said upper flange sheet has a thickness of between 25 and 60 μm.

* * * * *